(12) United States Patent
Dane et al.

(10) Patent No.: US 9,032,940 B2
(45) Date of Patent: May 19, 2015

(54) SYSTEMS AND METHODS FOR DEDICATED EXHAUST GAS RECIRCULATION AND CONTROL

(71) Applicant: Cummins Inc., Columbus, IN (US)

(72) Inventors: Marten H. Dane, Columbus, IN (US); Samuel C. Geckler, Columbus, IN (US); Sudhanshu Talwar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 203 days.

(21) Appl. No.: 13/744,928

(22) Filed: Jan. 18, 2013

(65) Prior Publication Data

US 2014/0202433 A1 Jul. 24, 2014

(51) Int. Cl.
*F02D 41/00* (2006.01)
*F02M 25/07* (2006.01)

(52) U.S. Cl.
CPC ........ *F02D 41/0065* (2013.01); *F02M 25/0707* (2013.01); *F02M 25/0709* (2013.01); *F02M 25/0749* (2013.01); *F02D 41/008* (2013.01); *F02D 41/005* (2013.01)

(58) Field of Classification Search
CPC ....... Y02T 10/18; Y02T 10/47; Y02T 10/121; F02D 13/0207; F02D 13/0257; F02D 2041/001; F02D 41/0007; F02D 13/0219; F02D 13/0249; F02D 13/0242; F02D 13/0246; F02D 13/0261; F02M 25/07; F02M 25/0707; F02M 25/077; F02M 25/0704
USPC ........ 123/568.1–568.321; 60/278, 602, 605.2
See application file for complete search history.

(56) References Cited

U.S. PATENT DOCUMENTS

| | | | |
|---|---|---|---|
| 5,517,976 A * | 5/1996 | Bachle et al. | 123/568.11 |
| 6,286,489 B1 * | 9/2001 | Bailey | 123/568.11 |
| 7,043,914 B2 * | 5/2006 | Ishikawa | 60/605.2 |
| 7,389,770 B2 | 6/2008 | Bertilsson et al. | |
| 7,512,479 B1 | 3/2009 | Wang | |
| 7,721,541 B2 | 5/2010 | Roberts, Jr. et al. | |
| 7,975,478 B2 * | 7/2011 | Zielke et al. | 60/605.2 |
| 2006/0112940 A1 * | 6/2006 | Roberts et al. | 123/568.11 |
| 2007/0193270 A1 * | 8/2007 | Roozenboom et al. | 60/612 |
| 2009/0199825 A1 * | 8/2009 | Piper et al. | 123/568.21 |
| 2009/0308070 A1 * | 12/2009 | Alger et al. | 60/602 |

(Continued)

FOREIGN PATENT DOCUMENTS

| | | |
|---|---|---|
| EP | 1 493 907 B1 | 2/2007 |
| GB | 2 458 968 A | 10/2009 |

(Continued)

OTHER PUBLICATIONS

International Searching Authority, Notification of Transmittal of The International Search Report and The Written Opinion of the International Searching Authority, or the Declaration, May 9, 2014, 13 pages.

*Primary Examiner* — Mahmoud Gimie
*Assistant Examiner* — Sizo Vilakazi
(74) *Attorney, Agent, or Firm* — Krieg DeVault LLP

(57) ABSTRACT

Systems and methods for exhaust gas recirculation are provided. The system includes a dedicated exhaust gas recirculation loop for recirculating exhaust gas flow from at least one dedicated cylinder of an engine into an intake system prior to combustion. The system further includes a low pressure exhaust gas recirculation loop for increasing the exhaust gas recirculation amount above that provided by the dedicated exhaust gas recirculation loop.

15 Claims, 2 Drawing Sheets

(56) References Cited

U.S. PATENT DOCUMENTS

| | | |
|---|---|---|
| 2010/0071365 A1 | 3/2010 | Laermann et al. |
| 2012/0048244 A1 | 3/2012 | Hayman et al. |
| 2012/0204844 A1 | 8/2012 | Gingrich et al. |
| 2012/0204845 A1 | 8/2012 | Gingrich et al. |
| 2012/0260895 A1 | 10/2012 | Hayman et al. |
| 2012/0285163 A1 | 11/2012 | Hayman et al. |
| 2012/0285426 A1 | 11/2012 | Hayman et al. |
| 2012/0285427 A1 | 11/2012 | Hayman et al. |

FOREIGN PATENT DOCUMENTS

| | | |
|---|---|---|
| WO | WO 2012/030816 A2 | 3/2012 |
| WO | WO 2012/039732 A1 | 3/2012 |

\* cited by examiner

SYSTEMS AND METHODS FOR DEDICATED EXHAUST GAS RECIRCULATION AND CONTROL

FIELD OF THE INVENTION

The present invention relates generally to exhaust gas recirculation in internal combustion engines, and more particularly is concerned with systems and methods for exhaust gas recirculation from one or more dedicated cylinders having controllable exhaust gas recirculation fraction through one or more low pressure exhaust gas recirculation loops.

BACKGROUND

The production of noxious nitrogen oxides ($NO_x$) by internal combustion engines which pollute the atmosphere are undesirable and in many cases are controlled by regulations established by governmental entities. Furthermore, spark ignited engines exhibit abnormal combustion phenomena called "knock", which occurs when combustion reactions in the unburned zone initiate rapid uncontrolled combustion prior to the arrival of the propagating flame front of a homogenous combustion process. One method for controlling knock includes increasing the flame propagation rate by, for example, improving the mixture homogeneity or by increasing the turbulence level induced by organized charge motion.

One technique for limiting or controlling the combustion temperature of the engine and thus reduce $NO_x$ emissions has been to recirculate a portion of the exhaust gas back to the engine air intake to lower the oxygen content in the intake air. This reduces the combustion temperature of the intake charge and in turn reduces the amount of $NO_x$ formation during combustion due to lower flame temperatures. In order to recirculate exhaust gas, an exhaust gas recirculation (EGR) line that connects the exhaust manifold to the intake air supply line is provided.

A technique to increase the flame propagation rate to address knock is to have one or more cylinders dedicated to providing EGR flow to the engine intake. When the EGR line is connected with one or more dedicated cylinders, the engine acts as a positive displacement pump to drive the EGR flow, eliminating pumping losses in transporting exhaust to the intake system and allowing a wide range of engine out nitrous oxide emissions to be achieved. Also, since the exhaust from the dedicated cylinder does not escape the engine, it is possible to have alternative combustion processes with the dedicated cylinder(s), such as running the dedicated cylinder(s) in a rich combustion condition to generate a favorable species like hydrogen. In addition, a variable geometry turbocharger is not required to drive EGR flow, facilitating meeting of target air-fuel ratios.

While engines operating with one or more cylinders as dedicated EGR cylinders enjoy greatly simplified controls and pressure management, fewer hardware devices, and other benefits, these simplifications come at the cost of a loss of control over the system, including a loss of control of the EGR fraction. When nominal cylinders are dedicated to providing EGR, and standard fueling and controls are applied, the EGR fraction provided by the cylinders is limited to the simple ratio of the number of EGR cylinders to the total number of cylinders. For example, an engine with one cylinder dedicated to EGR and four cylinders total will operate at a 25% EGR fraction if all of the cylinders are operated in the same manner. However, obtaining EGR fractions that vary from EGR fraction provided by the dedicated cylinder(s) while maintaining a similar operation across the cylinders has heretofore been unachieved.

Thus, problems remain in obtaining a proper mix of the EGR flow with the intake air flow over a wide range of engine operating conditions while achieving distribution of the EGR flow among the engine cylinders. Therefore, systems, methods and devices are needed to improve EGR flow in systems that employ one or more engine cylinders that are dedicated to providing EGR flow.

SUMMARY

Embodiments include unique systems and methods for exhaust gas recirculation. The systems and methods include a dedicated exhaust gas recirculation system for recirculating exhaust gas flow from at least one dedicated cylinder of an engine into an air intake system prior to combustion. The systems and methods further include a low pressure exhaust gas recirculation system that allows the exhaust gas recirculation fraction to be controlled relative to the EGR fraction provided by the dedicated exhaust gas recirculation system. Further embodiments, forms, objects, features, advantages, aspects, and benefits shall become apparent from the following description and drawings.

DESCRIPTION OF ILLUSTRATIVE EMBODIMENTS

Figure 1:
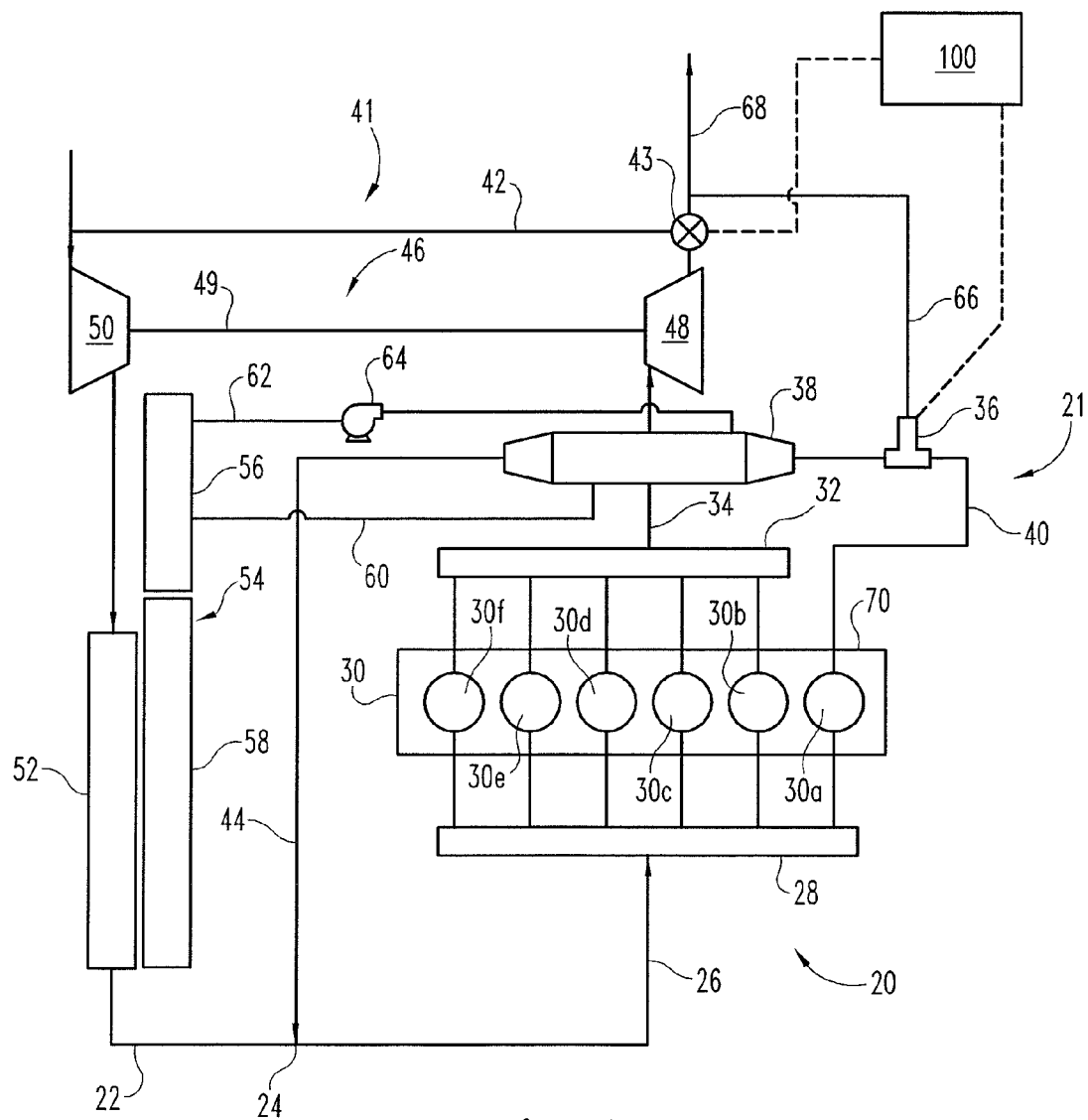
FIG. 1 is a schematic illustration of an internal combustion engine system that is configured to provide dedicated EGR flow from one or more dedicated cylinders and low pressure EGR flow from one or more non-dedicated cylinders to vary the dedicated EGR fraction.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a system 20 for controlling EGR flow is illustrated in schematic form. System 20 is depicted having an engine 30 with an intake and exhaust system connected by a dedicated EGR system or loop 21 and a low pressure EGR system or loop 41. The engine 30 is an internal combustion engine of any type, and can include a stoichiometric engine, a gasoline engine, alcohol engine (e.g. ethanol or methanol), or a natural gas engine. In certain embodiments, the engine 30 includes a lean combustion engine such as a lean burn gasoline engine, lean burn alcohol engine, lean burn natural gas engine, or a diesel cycle engine. In certain embodiments, the engine 30 may be any engine type producing emissions that may be used in an exhaust gas recirculation (EGR) system to, for example to reduce knock and $NO_x$ emissions from the engine 30. In the illustrated embodiment, the engine 30 includes six cylinders 30a-30f in an in-line arrangement. However, the number of cylinders may be any number, and the arrangement of cylinders may be any arrangement, and is not limited to the number and arrangement shown in FIG. 1.

The engine 30 includes at least one dedicated EGR cylinder 30a, and the remaining cylinders 30b-30f not dedicated to EGR. While only one dedicated EGR cylinder 30a is shown in FIG. 1, two or more dedicated EGR cylinders are also contemplated. The term dedicated EGR, as utilized herein, should be read broadly. Any EGR arrangement wherein, during at least certain operating conditions, the entire exhaust output of certain dedicated cylinder(s) is recirculated to the engine intake is a dedicated EGR arrangement. In the system 20, the exhaust gas from the dedicated cylinders recirculates and combines with intake gases at a position upstream of an intake manifold 28 of engine 30. The recirculated exhaust gas may combine with the intake gases at a mixer (not shown) at mixing location 24 or by any other arrangement. In certain embodiments, the recirculated exhaust gas returns to the intake manifold 28 directly. The dedicated EGR system 21 of FIG. 1 may be a high-pressure loop or system, for example, by returning the exhaust of the dedicated EGR cylinder(s) 30a to the intake at a position downstream of a compressor 50 as shown, or a low-pressure loop, for example, by returning to the intake at a position upstream of a compressor Engine 30 includes an engine block 70 that at least partially defines the cylinders 30a-30f. A piston (not shown) may be slidably disposed within each cylinder 30a-30f to reciprocate between a top-dead-center position and a bottom-dead-center position, and a cylinder head (not shown) may be associated with each cylinder 30a-30f. Each of the cylinders 30a-30f, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 30a-30f moves through an intake stroke, a compression stroke, a combustion or power stroke, and an exhaust stroke. Thus, during each complete cycle for the depicted six cylinder engine, there are six strokes during which air is drawn into individual combustion chambers from intake manifold supply conduit 26. In the illustrated embodiment, during five strokes exhaust is expelled from individual cylinders 30b-30f to an exhaust conduit 34, and during one exhaust stroke exhaust gas is expelled from cylinder 30a to a recirculating exhaust gas supply conduit 40 to provide a dedicated EGR fraction of about 16%. These strokes correspond with pulsations of air and exhaust within the respective systems. It should be understood that other dedicated EGR fractions are contemplated. For example, an arrangement with two dedicated EGR cylinders provides a dedicated EGR fraction of 33%, and a four cylinder engine with a single dedicated cylinder provides a dedicated EGR fraction of 25%.

Low pressure EGR system 41 provides recirculated exhaust gas from the non-dedicated cylinders 30b-30f to the intake of engine 30. The intake includes an inlet supply conduit 22, a mixing location 24, an intake manifold supply conduit 26, and an engine intake manifold 28 connected to engine 30. System 20 also includes an exhaust system coupled to engine 30 that includes an engine exhaust manifold 32, exhaust conduit 34, a turbocharger 46, and an after-treatment system (not shown) for removing one or more pollutants from the exhaust gas stream.

Dedicated EGR system 21 includes a recirculating exhaust gas supply conduit 40 that is separate from exhaust flow conduit 34. Supply conduit 40 extends from and is in flow communication with the combustion chamber(s) 30a of engine 30 dedicated solely to supply exhaust gas flow to supply conduit 40. The dedicated EGR system 21 may also include an EGR cooler 38 and an EGR flow valve 36 that allows the flow of exhaust from the dedicated cylinder/combustion chamber to EGR cooler 38 to be varied. In certain embodiments EGR flow valve 36 is omitted. EGR flow in dedicated EGR system 21 continues from EGR cooler 38 through an EGR conduit 44 to mixing location 24 where EGR flow is mixed with inlet flow from inlet supply conduit 22. EGR conduit 44 is flow coupled to mixing location 24 and the inlet supply conduit 22 is flow coupled to mixing location 24 to create a charge flow that includes combined inlet flow and recirculated exhaust gas from dedicated EGR system 21. The charge flow created at mixing location 24 is flow coupled to engine intake manifold 28 through intake manifold supply conduit 26.

The dedicated EGR cylinder(s) 30a of engine 30 is flow coupled to EGR cooler 38 through recirculating exhaust gas supply conduit 40 and EGR valve 36, and EGR cooler 38 is flow coupled to mixing location 24 through EGR conduit 44. EGR cooler 38 may further be connected to a radiator system 54 including a low temperature radiator 56 and a high temperature radiator 58. A coolant return line 60 extends from EGR cooler 38 to radiator system 54 and a coolant supply line 62 supplies coolant from radiator system 54 to EGR cooler 38. Coolant supply line 62 may include a pump 64 to provide circulation of coolant flow. In another embodiment, the coolant system may utilize only one radiator, such as radiator 58. In still other embodiments, dedicated EGR system 21 includes a bypass and a control valve to selectively bypass all or a portion of the dedicated EGR flow around EGR cooler 38.

In one embodiment, exhaust conduit 34 is flowed coupled to exhaust manifold 32, and may also include one or more intermediate flow passages, conduits or other structures. Exhaust conduit 34 extends to a turbine 48 of turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to a compressor 50 flow coupled to inlet supply conduit 22. Inlet supply conduit 22 may include a charge air cooler 52 downstream from compressor 50 and upstream from mixing location 24. In another embodiment, a charge air cooler 52 is located in the intake system downstream from mixing location 24.

Low pressure EGR system 41 includes a low pressure EGR conduit 42 extending between and connecting the exhaust system to the intake system downstream of turbine 48 and upstream of compressor 50. In the illustrated embodiment, low pressure EGR system 41 includes a control valve 43 that is controllable to introduce a selected portion of the exhaust gas flow into conduit 42 for low pressure EGR flow to the intake system. The EGR flow from low pressure EGR system 41 is combined with intake air to provide an inlet flow in inlet supply conduit 22 that mixes with the EGR flow from dedicated EGR system 21 at mixing location 24. The components illustrated in FIG. 1 are not exclusive of all components and/or arrangements that may be included in system 20. Furthermore, one or more of the illustrated components in system 20 may be omitted. For example, in one embodiment, conduit 42 is connected to a low pressure EGR cooler (not shown)

having one or more control valves 43 on the intake and/or outlet side of the cooler. In an alternative embodiment, low pressure EGR system 41 is a high pressure EGR system that connects the exhaust system to the intake system upstream of turbocharger 46.

In operation of system 20, fresh air is supplied through inlet air supply conduit 22. Furthermore, in certain conditions recirculated exhaust gas from low pressure EGR system 41 is combined with the fresh air upstream of mixing location 24. The fresh air flow or combined flows can be filtered, unfiltered, and/or conditioned in any known manner, either before or after mixing with the dedicated EGR flow from dedicated EGR system 21. The intake system may include components configured to facilitate or control introduction of the combined flow to engine 30, and may include an induction valve or throttle (not shown), one or more compressors 50, and charge air cooler 52. The induction valve may be connected upstream or downstream of compressor 50 via a fluid passage and configured to regulate a flow of atmospheric air and/or combined flow to engine 30. Compressor 50 may be a fixed or variable geometry compressor configured to receive air or combined flow from the induction valve and compress the air or combined flow to a predetermined pressure level before engine 30. Charge air cooler 52 may be disposed within inlet air supply conduit 22 between engine 30 and compressor 50, and embody, for example, an air-to-air heat exchanger, an air-to-liquid heat exchanger, or a combination of both to facilitate the transfer of thermal energy to or from the flow directed to engine 30.

In one embodiment, ambient air and/or combined flow is pressurized with compressor 50 and sent through charge air cooler 52 before delivery to mixing location 24. Control valve 43 is operable to proportionally control a recirculation of a portion of exhaust gas from non-dedicated cylinders 30b-30f through low pressure EGR system 41, and EGR valve 36 is operable to proportionally control recirculation of all or a portion of exhaust gas from dedicated cylinder 30a through dedicated EGR system 21 to mixing location 24. EGR valve 36 and/or control valve 43 may be actuatable to control the proportion of exhaust gas that is recirculated from dedicated cylinder(s) 30a and/or non-dedicated cylinders 30b-30f, or one or both may simply be an on/off type valve with proportion control provided exclusively by other means. In embodiments in which only a portion of exhaust gas is recirculated from dedicated cylinder(s) 30a, an EGR flow measurement sensor or intake oxygen measurement sensor may be provided to estimate the amount of EGR flow that is inducted into cylinders 30a-30f. In still other embodiments, there is no EGR valve 36 and dedicated EGR flow is provided continuously during engine operation. The EGR flow from dedicated EGR system 21 is distributed and mixed with inlet air and EGR flow from low pressure EGR system 41 received from inlet air supply conduit 22 at mixing location 24. The air-exhaust gas mixture is then supplied to engine 30 through intake manifold supply conduit 26 to engine intake manifold 28.

Exhaust gas which is not recirculated through EGR valve 36 continues through an exhaust conduit 66 to an outlet conduit 68 downstream of turbine 44 and then, along with exhaust gas from exhaust conduit 34, is outlet through an aftertreatment system (not shown) to a tail pipe or other structure to the atmosphere or recirculated with low pressure EGR system 41. The exhaust system along outlet conduit 68 may include components configured to treat exhaust from engine 30 before release to the atmosphere. Specifically, the exhaust system may include, for example, oxidation devices (DOC), particulate removing devices (DPF, CDPF), constituent absorbers or reducers (SCR, AMOX, LNT), three-way catalysts for stoichiometric spark ignited engines, attenuation devices (mufflers), controllers, etc., if desired.

In operation, engine 30 produces an exhaust gas stream from non-dedicated cylinders 30b-30f into exhaust conduit 34, an exhaust stream from dedicated cylinder(s) 30a into dedicated EGR system 21, and receives a charge flow from intake manifold supply conduit 26 comprising intake air and, in situations in which exhaust gas is recirculated, recirculated exhaust gas from one or both of dedicated EGR system 21 and low pressure EGR system 41. The engine 30 is fluidly coupled to intake manifold 28 and exhaust manifold 32, and the EGR stream passes from the one or more dedicated cylinder(s) 30a through EGR valve 36. The dedicated EGR supply conduit 40 is illustrated as exiting the dedicated cylinder 30a, but may include one or more branch lines to receive exhaust from one or more of the other cylinders dedicated to providing EGR flow.

In certain embodiments, the system 20 includes a controller 100 structured to perform certain operations to control engine operations and recirculation of exhaust gas thereto. In certain embodiments, the controller 100 forms a portion of a processing subsystem including one or more computing devices having memory, processing, and communication hardware. The controller 100 may be a single device or a distributed device, and the functions of the controller 100 may be performed by hardware or software. The controller 100 may be included within, partially included within, or completely separated from an engine controller (not shown). The controller 100 is in communication with any sensor or actuator throughout the system 20, including through direct communication, communication over a datalink, and/or through communication with other controllers or portions of the processing subsystem that provide sensor and/or actuator information to the controller 100.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The schematic flow description which follows provides an illustrative embodiment of performing procedures for providing compositional feedback control of a dedicated EGR system in combination with a low pressure EGR system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 2:
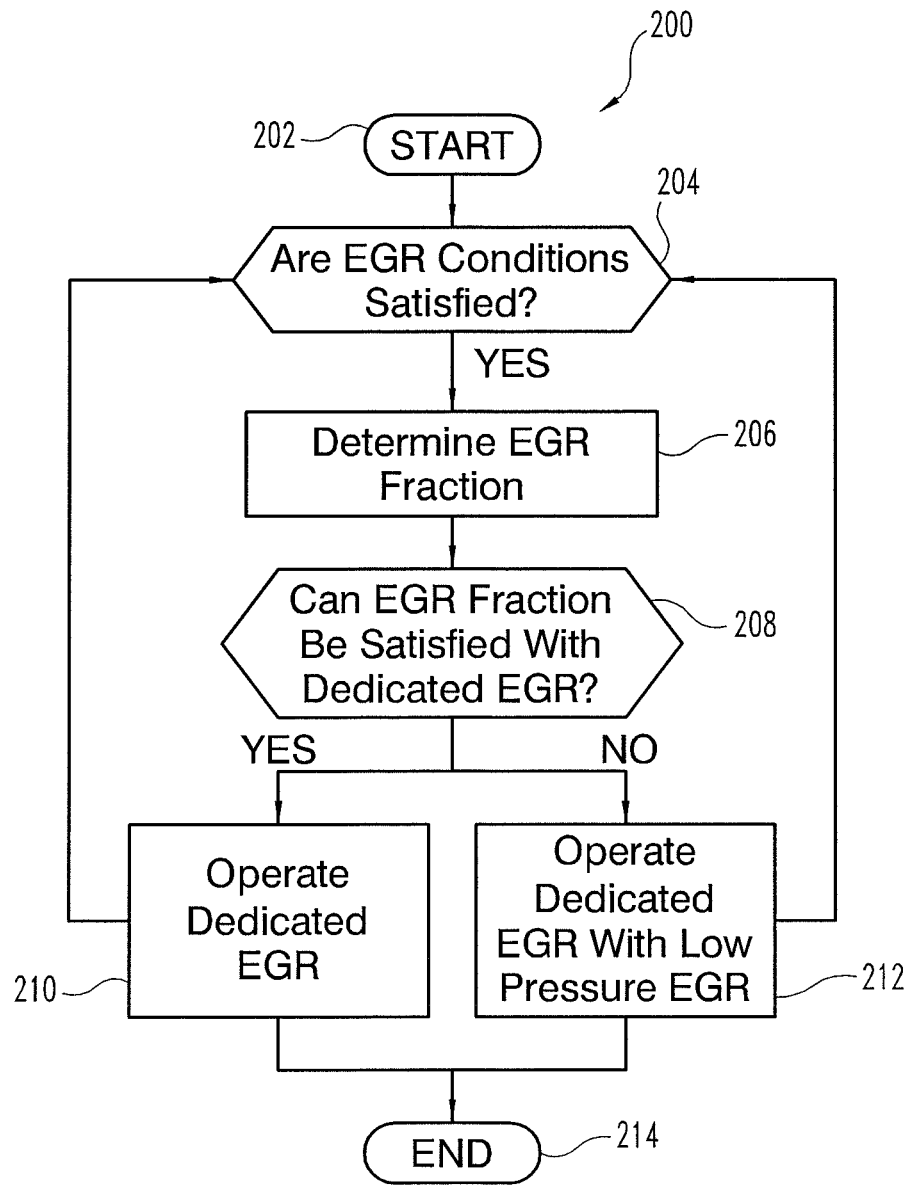
FIG. 2 is a flow diagram of a method for controlling the EGR fraction.

In FIG. 2, one embodiment of a flow diagram for operating engine 30 with a dedicated EGR system 21 and a low pressure EGR system 41 is disclosed. Procedure 200 starts at 202 upon, for example, starting of engine 30. At conditional 204 it is determined whether EGR conditions are satisfied. The determination of whether EGR conditions are satisfied may include, for example, a consideration of engine operating conditions and/or levels of pollutants in the exhaust gas. If EGR conditions are not satisfied, procedure 200 remains at step 204 to monitor EGR conditions until the operation of engine 30 is terminated.

If EGR conditions are satisfied, procedure 200 continues at operation 206 where the EGR fraction is determined. The EGR fraction can be, for example, the desired amount or part of recirculated exhaust gas to be included in the charge flow to engine 30 to satisfy predetermined operating criteria. For example, the EGR fraction can vary from 0% to 50% of EGR flow in the charge flow. Furthermore, the EGR fraction can include multiple components. For example, in certain conditions it may be desired for all or a portion of the EGR fraction to be provided by the dedicated EGR system 21 to satisfy certain operating conditions of engine 30.

Procedure 200 continues from operation 206 at conditional 208 where it is determined whether the target EGR fraction can be satisfied by with the dedicated EGR system 21 alone. If affirmative, procedure 200 continues at operation 210 where dedicated EGR system 21 is operated with EGR valve 36 controlled to provide the EGR flow that satisfies the target EGR fraction. For example, in an arrangement where dedicated EGR system 21 includes a single cylinder providing dedicated EGR flow in a six cylinder engine, dedicated EGR system 21 can be operated and controlled with EGR valve 36 to satisfy an EGR fraction up to about 16%. If the desired or target EGR fraction is more than 16%, then with the aforementioned the conditional 208 is negative and procedure 200 continues at operation 212 where low pressure EGR system 41 can be operated to supplement the EGR fraction supplied by dedicated EGR system 21. The supplied EGR fraction can thus be increased by more than the portion of the target EGR fraction supplied by dedicated EGR system 21. For example, if the target EGR fraction is 50%, and the dedicated EGR system 21 can supply 16% EGR flow and low pressure EGR system 41 can be operated to supply 34% of the EGR low to satisfy the 50% EGR fraction.

One example system and method includes an internal combustion engine having a number of cylinders, where at least one of the cylinders includes a dedicated EGR cylinder. The system further includes a controller that interprets a target EGR fraction corresponding to a fraction of EGR flow in the total charge flow to be received by intake manifold 28, and in response to the target EGR fraction provide EGR flow from dedicated EGR system 21 and, if necessary, from low pressure EGR system 41. In certain embodiments, the controller interprets an engine operating condition (e.g. an engine speed, engine temperature, engine load, engine transient operation indication), and in response to the engine operating condition the controller selects the target EGR fraction. In certain conditions, the system includes a number of dedicated EGR cylinders, where one or more of the dedicated EGR cylinders provides the entire EGR flow to satisfy the target EGR fraction. In certain embodiments, a combination of flow from the dedicated EGR system 21 and low pressure EGR system 41 satisfies the target EGR fraction. In certain embodiments, the controller modulates one or both of the EGR valve 36 and control valve 43 to provide an EGR flow that satisfies the target EGR fraction.

In certain embodiments, the example system further includes a controller 100 that interprets a target EGR fraction, and in response to the target EGR fraction provides an EGR flow control command to EGR valve 36 and/or control valve 43. The system further includes a variable flow control device such as EGR valve 36 operationally coupled to the dedicated EGR cylinder(s) and a variable flow control device such as control valve 43 operationally coupled to the non-dedicated EGR cylinders, each of which is responsive to the EGR flow control command. The variable flow control devices may be any type known in the art. Accordingly, control over the realized EGR fraction of the system is achievable, having the benefit of the disclosures herein, in a system utilizing one or more dedicated EGR cylinders and a low pressure EGR system receiving exhaust flow from non-dedicated cylinders.

As is evident from the figures and text presented above, a variety of aspects are contemplated. According to one aspect, a method comprises operating an internal combustion engine including a plurality of cylinders, an exhaust system, and an intake system, at least one of the plurality of cylinders being operably connected to provide exhaust flow to a dedicated exhaust gas recirculation system and a remaining portion of the plurality of cylinders being operably connected to provide exhaust flow to the exhaust system; determining an amount of recirculated exhaust gas to include in a charge flow to the internal combustion engine during operation; providing a first portion of the amount of recirculated exhaust gas with exhaust flow from the dedicated exhaust gas recirculation system; and providing a remaining portion of the amount of recirculated exhaust gas from exhaust flow in the exhaust system through a low pressure exhaust gas recirculation loop connecting the exhaust system to the intake system.

In one embodiment, the low pressure exhaust gas recirculation loop is connected to the intake system upstream of a compressor in the intake system and downstream of a turbine in the exhaust system. In a refinement of this embodiment, the dedicated exhaust gas recirculation system is connected to the intake system downstream of the compressor.

In another embodiment, the dedicated exhaust gas recirculation system includes a flow control valve operable to control the first portion of the amount of recirculated exhaust gas. In one refinement of this embodiment, the low pressure exhaust gas recirculation system includes a flow control valve operable to control the remaining portion of the amount of recirculated exhaust gas.

According to another aspect, a method comprises operating an engine having a plurality of cylinders; directing a charge flow into the plurality of cylinders from an intake system; combusting a mixture of the charge flow and fuel within the plurality of cylinders to generate a power output and a flow of exhaust; directing a first portion of the flow of exhaust to a dedicated exhaust gas recirculation system to mix with the charge flow in the intake system prior to combustion, wherein the first portion of the flow of exhaust is created by combustion in at least one of the plurality of cylinders dedicated to providing the first portion of the flow of exhaust; directing a first part of a second portion of the flow of exhaust to the intake system to mix with the charge flow; and directing a second part of the second portion of the flow of exhaust to an exhaust outlet, wherein the second portion of the flow of exhaust is created by combustion in a plurality of cylinders not dedicated to exhaust gas recirculation.

In one embodiment of the method, the first part of the second portion of the flow of exhaust is recirculated in a low pressure exhaust gas recirculation system. In a refinement of this embodiment, a turbocharger is provided that includes a turbine for receiving the second portion of the flow of exhaust and a compressor connected to the intake system. In yet a further refinement of this embodiment, the low pressure exhaust gas recirculation system is connected downstream of the turbine and upstream of the compressor.

In another embodiment, the method includes controlling the first part of the second portion of the flow of exhaust with a flow control valve. In a refinement of this embodiment, the method includes controlling the first portion of the flow of exhaust with a second flow control valve.

In a further embodiment of the method, directing the first part of the second portion of the flow of exhaust to the intake system to mix with the charge flow includes determining that a target exhaust gas recirculation fraction of the charge flow exceeds the amount of recirculated exhaust gas that can be provided from the dedicated exhaust gas recirculation system.

According to another aspect, a system includes and an engine with a plurality of cylinders and an intake system configured to direct a charge flow to all of the plurality of cylinders. The system also includes an exhaust system configured to receive exhaust from a first portion of the plurality of cylinders and selectively direct a part of the exhaust from the first portion of the plurality of cylinders to a low pressure exhaust gas recirculation system connected to the intake passage. The system also includes a dedicated exhaust gas recirculation system that is configured to receive exhaust from a second portion of the plurality of cylinders and direct the exhaust from the second portion of the plurality of cylinders to the intake passage.

In one embodiment, the second portion of the plurality of cylinders is dedicated entirely to providing exhaust to the intake passage. In another embodiment, the first portion of the plurality of cylinders is dedicated entirely to providing exhaust to a turbocharger system. In a refinement of this embodiment, the low pressure exhaust gas recirculation system is connected downstream of a turbine of the turbocharger system and upstream of a compressor of the turbocharger system.

In a further embodiment, the second portion of the plurality of cylinders consists of no more than one third of the plurality of cylinders. In a refinement of this embodiment, the first portion of the plurality of cylinders includes at least two cylinders.

In another embodiment, the system includes a first control valve connecting the low pressure exhaust gas recirculation system to the intake system and a second control valve configured to regulate exhaust flow through the dedicated exhaust gas recirculation system. In a refinement of this embodiment, the first control valve is connected to the exhaust passage downstream of a turbocharger in the exhaust passage.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine including a plurality of cylinders, an exhaust system, and an intake system, at least one of the plurality of cylinders being operably connected to only provide exhaust flow to a dedicated exhaust gas recirculation system and a remaining portion of the plurality of cylinders being operably connected to provide exhaust flow to the exhaust system;
   determining an amount of recirculated exhaust gas to include in a charge flow to the internal combustion engine during operation;
   providing a first portion of the amount of recirculated exhaust gas with exhaust flow from the dedicated exhaust gas recirculation system; and providing a remaining portion of the amount of recirculated exhaust gas from exhaust flow in the exhaust system through a low pressure exhaust gas recirculation loop connecting the exhaust system to the intake system, wherein the low pressure exhaust gas recirculation loop is connected to the intake system upstream of a compressor in the intake system and downstream of a turbine in the exhaust system.

2. The method of claim 1, wherein the dedicated exhaust gas recirculation system is connected to the intake system downstream of the compressor.

3. The method of claim 1, wherein the dedicated exhaust gas recirculation system includes a flow control valve operable to control the first portion of the amount of recirculated exhaust gas.

4. The method of claim 1, wherein the low pressure exhaust gas recirculation system includes a flow control valve operable to control the remaining portion of the amount of recirculated exhaust gas.

5. A method, comprising:
   operating an engine having a plurality of cylinders and a turbocharger including a turbine and a compressor;
   directing a charge flow into the plurality of cylinders from an intake system, the compressor being connected to the intake system;
   combusting a mixture of the charge flow and fuel within the plurality of cylinders to generate a power output and a flow of exhaust;
   directing a first portion of the flow of exhaust to a dedicated exhaust gas recirculation system to mix with the charge flow in the intake system prior to combustion, wherein the first portion of the flow of exhaust is created by combustion in at least one of the plurality of cylinders dedicated to providing only the first portion of the flow of exhaust;
   directing a first part of a second portion of the flow of exhaust to the intake system to mix with the charge flow, wherein the turbine receives the second portion of the flow of exhaust; and
   directing a second part of the second portion of the flow of exhaust to an exhaust outlet, wherein the second portion of the flow of exhaust is created by combustion in a plurality of cylinders not dedicated to exhaust gas recirculation, wherein:
   the first part of the second portion of the flow of exhaust is recirculated in a low pressure exhaust gas recirculation system; and
   the low pressure exhaust gas recirculation system is connected downstream of the turbine and upstream of the compressor.

6. The method of claim 5, further comprising controlling the first part of the second portion of the flow of exhaust with a flow control valve.

7. The method of claim 6, further comprising controlling the first portion of the flow of exhaust with a second flow control valve.

8. The method of claim 5, wherein directing the first part of the second portion of the flow of exhaust to the intake system to mix with the charge flow includes determining that a target exhaust gas recirculation fraction of the charge flow exceeds the amount of recirculated exhaust gas that can be provided from the dedicated exhaust gas recirculation system.

9. A system, comprising:
- an engine including a plurality of cylinders;
- an intake system configured to direct a charge flow to all of the plurality of cylinders;
- an exhaust system configured to receive exhaust from a first portion of the plurality of cylinders and selectively direct a portion of the exhaust from the first portion of the plurality of cylinders to a low pressure exhaust gas recirculation system connected to the intake passage; and
- a dedicated exhaust gas recirculation system configured to receive exhaust only from a second portion of the plurality of cylinders and direct the exhaust from the second portion of the plurality of cylinders to the intake passage, wherein the first portion of the plurality of cylinders is dedicated entirely to providing exhaust to a turbocharger system.

10. The system of claim 9, wherein the second portion of the plurality of cylinders is dedicated entirely to providing exhaust to the intake passage.

11. The system of claim 9, wherein the low pressure exhaust gas recirculation system is connected downstream of a turbine of the turbocharger system and upstream of a compressor of the turbocharger system.

12. The system of claim 9, wherein the second portion of the plurality of cylinders consists of no more than one third of the plurality of cylinders.

13. The system of claim 12, wherein the first portion of the plurality of cylinders includes at least two cylinders.

14. The system of claim 9, further including:
- a first control valve between the low pressure exhaust gas recirculation system to the intake system; and
- a second control valve configured to regulate exhaust flow through the dedicated exhaust gas recirculation system.

15. A system, comprising:
- an engine including a plurality of cylinders;
- an intake system configured to direct a charge flow to all of the plurality of cylinders;
- an exhaust system configured to receive exhaust from a first portion of the plurality of cylinders and selectively direct a portion of the exhaust from the first portion of the plurality of cylinders to a low pressure exhaust gas recirculation system connected to the intake passage;
- a dedicated exhaust gas recirculation system configured to receive exhaust only from a second portion of the plurality of cylinders and direct the exhaust from the second portion of the plurality of cylinders to the intake passage;
- a first control valve between the low pressure exhaust gas recirculation system to the intake system; and
- a second control valve configured to regulate exhaust flow through the dedicated exhaust gas recirculation system, wherein the first control valve is connected to the exhaust passage downstream of a turbocharger in the exhaust passage.

* * * * *